(12) United States Patent  
Ikeda

(10) Patent No.: US 8,881,262 B2
(45) Date of Patent: Nov. 4, 2014

(54) IMAGE PROCESSING APPARATUS AND USER AUTHENTICATION METHOD FOR IMAGE PROCESSING APPARATUS

(75) Inventor: Atsushi Ikeda, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 13/082,692

(22) Filed: Apr. 8, 2011

(65) Prior Publication Data

US 2011/0258697 A1   Oct. 20, 2011

(30) Foreign Application Priority Data

Apr. 15, 2010   (JP) ................................. 2010-094079

(51) Int. Cl.
- G06F 21/00 (2013.01)
- G06F 21/60 (2013.01)
- G06F 21/31 (2013.01)
- G06F 3/12 (2006.01)

(52) U.S. Cl.
CPC ............ *G06F 21/608* (2013.01); *G06F 3/1222* (2013.01); *G06F 21/31* (2013.01)
USPC .............................................. 726/16; 726/28

(58) Field of Classification Search
None
See application file for complete search history.

(56) References Cited

U.S. PATENT DOCUMENTS

| | | | | |
|---|---|---|---|---|
| 8,640,193 | B2* | 1/2014 | Shigeeda | 726/2 |
| 2001/0017700 | A1 | 8/2001 | Homma | |
| 2006/0136992 | A1* | 6/2006 | Shigeeda | 726/2 |
| 2007/0206211 | A1* | 9/2007 | Okutsu et al. | 358/1.14 |
| 2008/0309975 | A1* | 12/2008 | Kondoh | 358/1.15 |
| 2009/0077659 | A1* | 3/2009 | Segawa | 726/21 |
| 2014/0109183 | A1* | 4/2014 | Shigeeda | 726/3 |

FOREIGN PATENT DOCUMENTS

| | | |
|---|---|---|
| CN | 1934516 A | 3/2007 |
| EP | 1814053 A1 | 8/2007 |
| JP | 2007-041966 A | 2/2007 |
| JP | 2007-249417 A1 | 9/2007 |
| JP | 2009-271751 A | 11/2009 |
| WO | 2004/111806A A1 | 12/2004 |

* cited by examiner

*Primary Examiner* — Jeffery Williams
(74) *Attorney, Agent, or Firm* — Canon USA, Inc. IP Division

(57) ABSTRACT

An image processing apparatus includes a first authentication unit configured to authenticate a user, a second authentication unit configured to authenticate the user, an operation unit configured to receive an operation from the user, a logout unit configured to set the user in a logout state in which the user is unauthenticated, if a predetermined time has passed without the operation unit receiving any operation from the user while the user is authenticated by the first authentication unit or the second authentication unit, and a change unit configured to change the predetermined time to a second time shorter than a first time, if the user is unauthenticated by the second authentication unit while the user is authenticated by the first authentication unit and the second authentication unit.

13 Claims, 13 Drawing Sheets

FIG.7

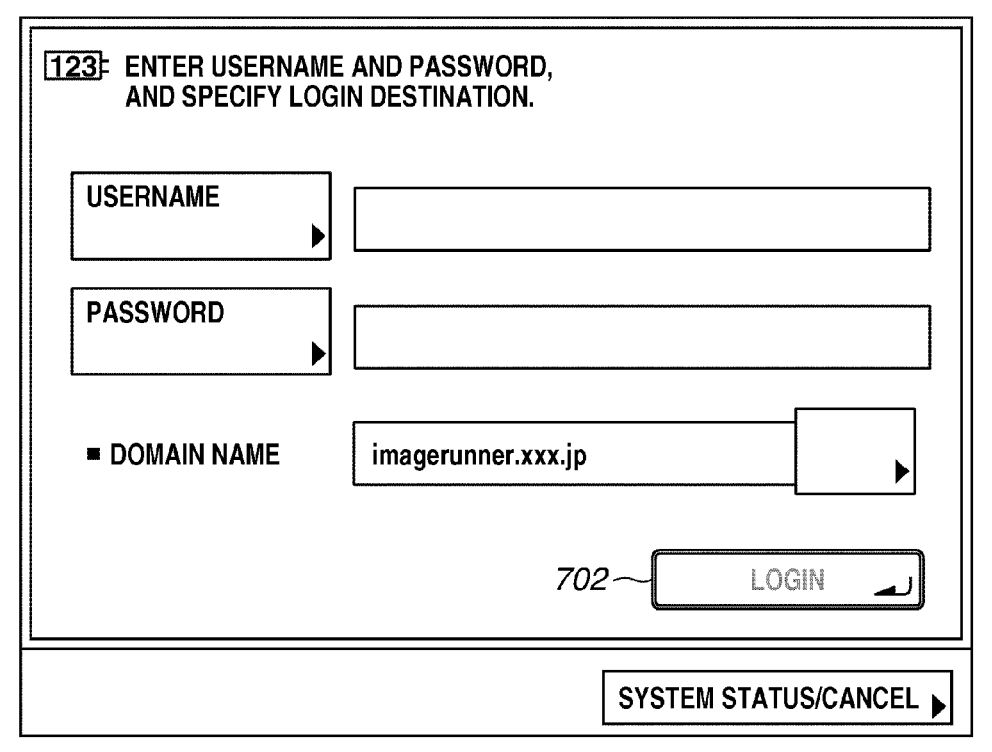

[123] ENTER USERNAME AND PASSWORD,
AND SPECIFY LOGIN DESTINATION.

USERNAME ▶

PASSWORD ▶

■ DOMAIN NAME   imagerunner.xxx.jp   ▶

702 — LOGIN

SYSTEM STATUS/CANCEL ▶

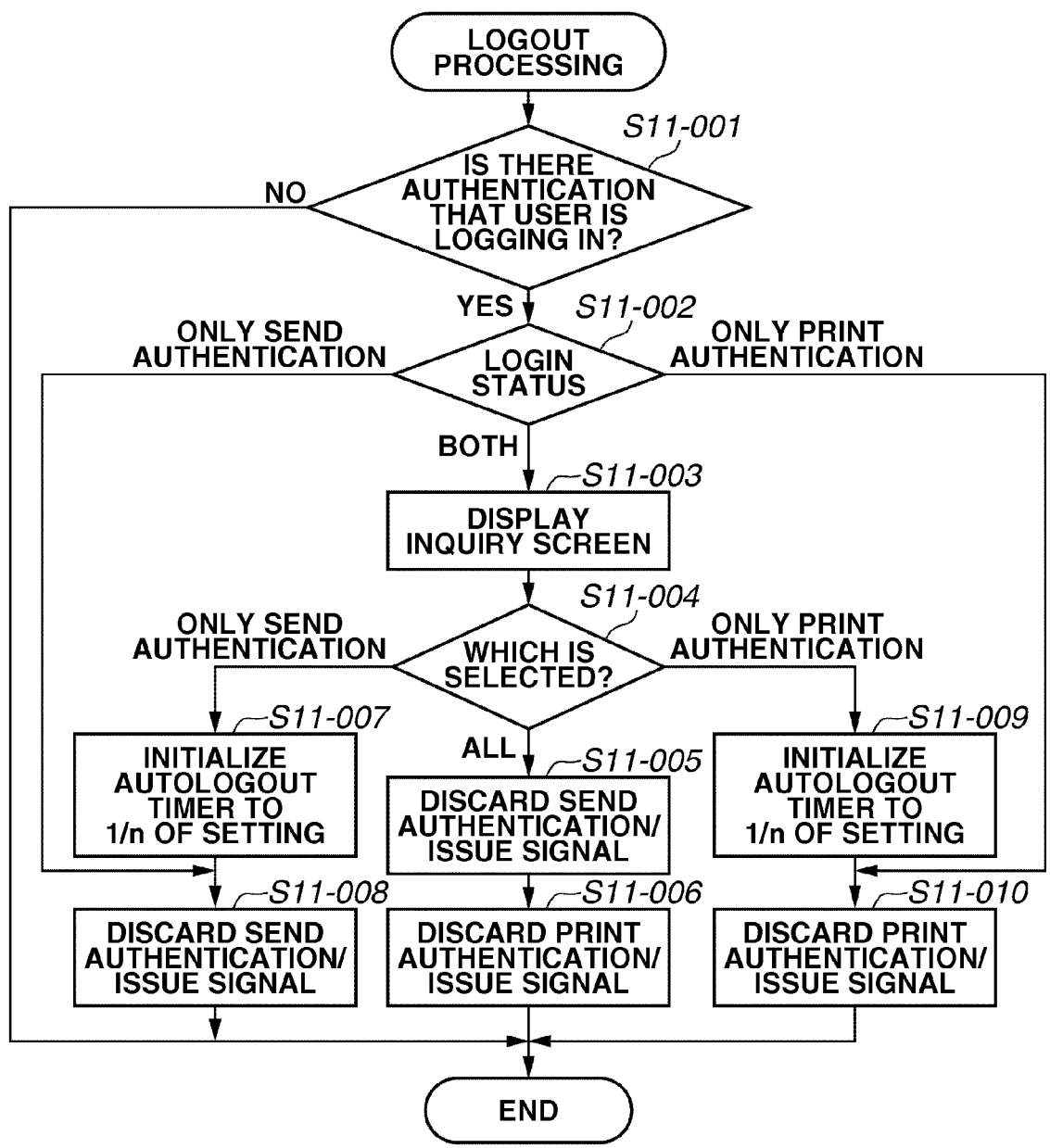

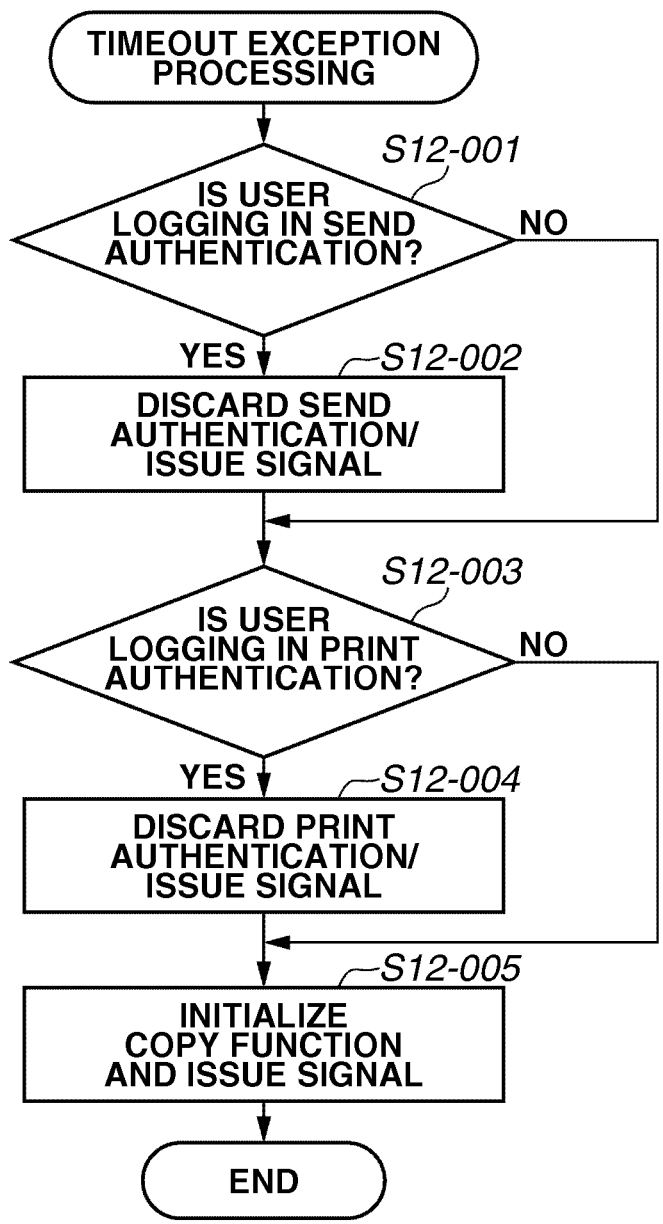

IMAGE PROCESSING APPARATUS AND USER AUTHENTICATION METHOD FOR IMAGE PROCESSING APPARATUS

BACKGROUND OF THE INVENTION

1. Field of the Invention

The present invention relates to an image processing apparatus requiring user authentication for use of the apparatus or a function thereof, and a user authentication method for the image processing apparatus.

2. Description of the Related Art

There is known an image processing apparatus allowing an authenticated user to use the apparatus, and application software for realizing user authentication in an image processing apparatus. Hereinafter, the term "device authentication" is used to refer to user authentication performed for allowing or limiting use of an apparatus Some of apparatuses employing the device authentication are configured to measure a time period that a user does not apply any operation while being logging in after user authentication, and automatically cause the user to logout if the user does not operate the apparatus for a predetermined time, for example, as discussed in Japanese Patent Application Laid-Open No. 2007-249417. Hereinafter, the term "auto-logout" is used to refer to this function.

According to Japanese Patent Application Laid-Open No. 2007-249417, the time period for the auto-logout can be changed for each user. Further, the time period for the auto-logout can be varied according to the degree of difficulty of an operation menu.

On the other hand, there is known an image processing apparatus allowing an authenticated user to use a specific function such as the send function or the print function. Hereinafter, the term "function authentication" is used to refer to user authentication performed for allowing or limiting use of a specific function provided to an apparatus.

Some image processing apparatuses are equipped with authentication means of both the device authentication and the function authentication, or equipped with a plurality of kinds of the function authentication. In this case, a user performs an operation for the device authentication enabling the user to use the image processing apparatus, and after that, performs an operation for the function authentication to use a specific function. Conventionally, this kind of apparatus is equipped with, for example, a logout button dedicated to each authentication on a touch panel, a keyboard, or the like.

However, conventional apparatuses using a plurality of kinds of authentication require a user to log out from both of the device authentication and the function authentication after the user is allowed to log in through an operation for the device authentication and an operation for the function authentication, and uses the image processing apparatus.

However, for example, a user, who actually intends to log out from the device authentication, may mistakenly log out from the function authentication and leaves the apparatus without being aware of his/her mistake. In this case, while the apparatus is left in such a state that this user is logging in the device authentication, another user may use the apparatus. This situation may lead to execution of a job by using a false identity.

SUMMARY OF THE INVENTION

The present invention is directed to an image processing apparatus capable of reducing as much as position the possibility that an unauthorized user may use the apparatus or a function of the apparatus. According to this image processing apparatus, it is possible to reduce as much as possible the possibility that, while a user does not yet log out from a part of a plurality of kinds of user authentication, another user may use the image processing apparatus.

According to an aspect of the present invention, an image processing apparatus includes a first authentication unit configured to authenticate a user, a second authentication unit configured to authenticate the user, an operation unit configured to receive an operation from the user, a logout unit configured to set the user in a logout state in which the user is unauthenticated, if a predetermined time has passed without the operation unit receiving any operation from the user while the user is authenticated by the first authentication unit or the second authentication unit, and a change unit configured to change the predetermined time to a second time shorter than a first time, if the user is unauthenticated by the second authentication unit while the user is authenticated by the first authentication unit and the second authentication unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a screen prompting an input of a username and password for the send authentication.

FIG. 11 is a flowchart illustrating an example of logout processing according to a second exemplary embodiment.

FIG. 12 is a flowchart illustrating an example of timeout exception processing according to the second exemplary embodiment.

DESCRIPTION OF THE EMBODIMENTS

Various exemplary embodiments, features, and aspects of the invention will be described in detail below with reference to the drawings.

Figure 1:
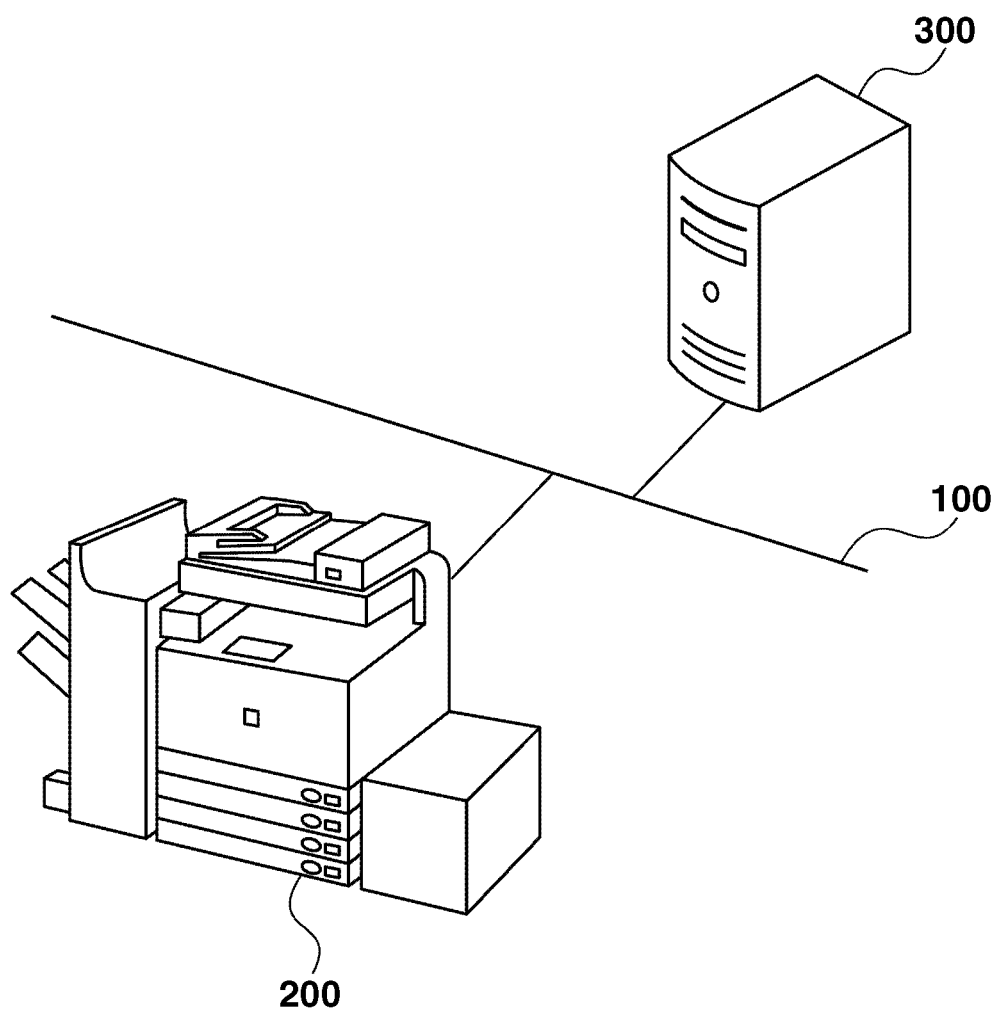
FIG. 1 illustrates an example of a system configuration including an image processing apparatus (MFP).

FIG. 1 illustrates an example of a system configuration including an image processing apparatus (MFP) according to a first exemplary embodiment.

A multi function peripheral (MFP) 200, which is an example of an image processing apparatus, is connected to a Lightweight Directory Access Protocol (LDAP) server 300 via a local area network (LAN) 100. The MFP 200 is a multi-function image processing apparatus provided with multiple functions such as the copy function, the print function, and the send function.

The MFP 200 realizes user authentication when a user uses the send function, which will be described below, by communicating with the LDAP server 300 under a predetermined protocol (LDAP). This protocol is a known technology, and therefore will be not described in detail herein. The LDAP server 300 is an example of an authentication server. Alternatively, the MFP 200 may be equipped with a user authentication means. In this case, LDAP 300 may be omitted.

Figure 2:
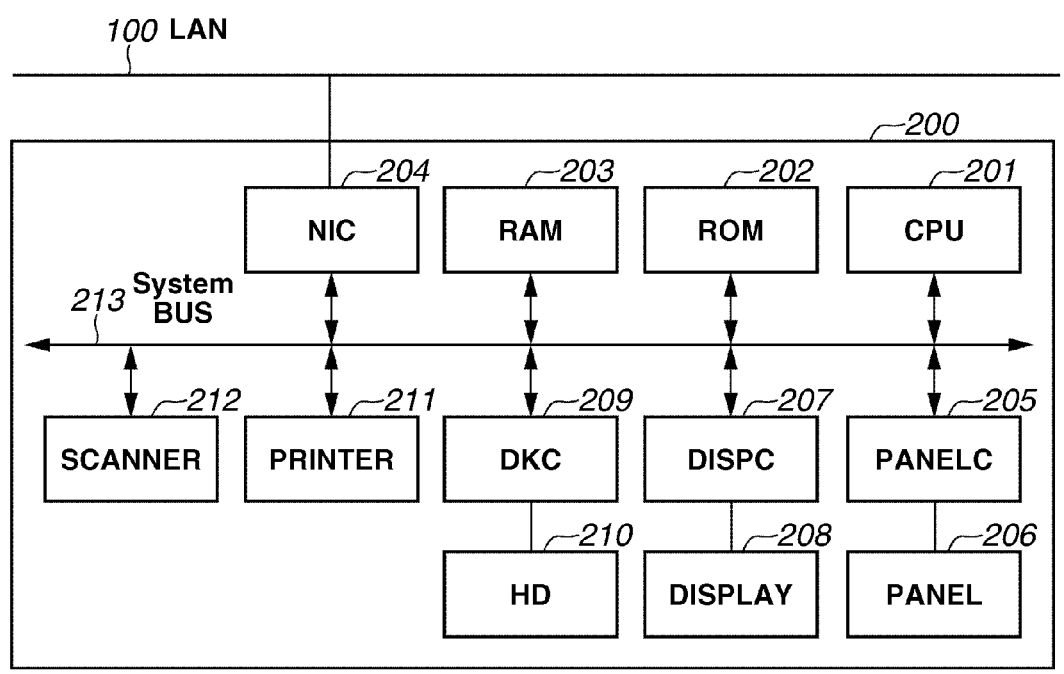
FIG. 2 is a block diagram illustrating an example of a hardware configuration of a multi function peripheral (MFP) 200.

FIG. 2 is a block diagram illustrating an example of a hardware configuration of the MFP 200.

The MFP 200 includes a central processing unit (CPU) 201, a read only memory (ROM) 202, a random access memory (RAM) 203, a network interface card (NIC) 204, an external input controller (PANELC) 205, and various buttons and a touch panel (PANEL) 206. The MFP 200 further includes a display controller (DIPC) 207, a display (DISPLAY, display unit) 208, a disk controller (DKC) 209, a hard disk (HD) 210, a printer unit (PRINTER) 211, and a scanner unit (SCANNER) 212.

The CPU 201 is in charge of overall control of devices connected to a system bus 213, and execution of firmware modules stored in the ROM 202, or the HD 210 which is a mass storage device. As the firmware modules, there are at least two modules. Updating the firmware modules can be executed individually for each module.

Further, the CPU 201 performs the processing illustrated in the flowcharts that will be described below, based on the firmware modules as the control program. In some cases, the HD 210 may be also used as an area for temporarily storing an image. The RAM 203 functions as a main memory and a work area of the CPU 201.

The PANELC 205 controls an instruction input from the PANEL 206 included in the MFP 200. The PANEL 206 includes various kinds of buttons, keys, a touch panel sheet, and the like, and constitutes an operation unit of the MFP 200.

Figure 9:
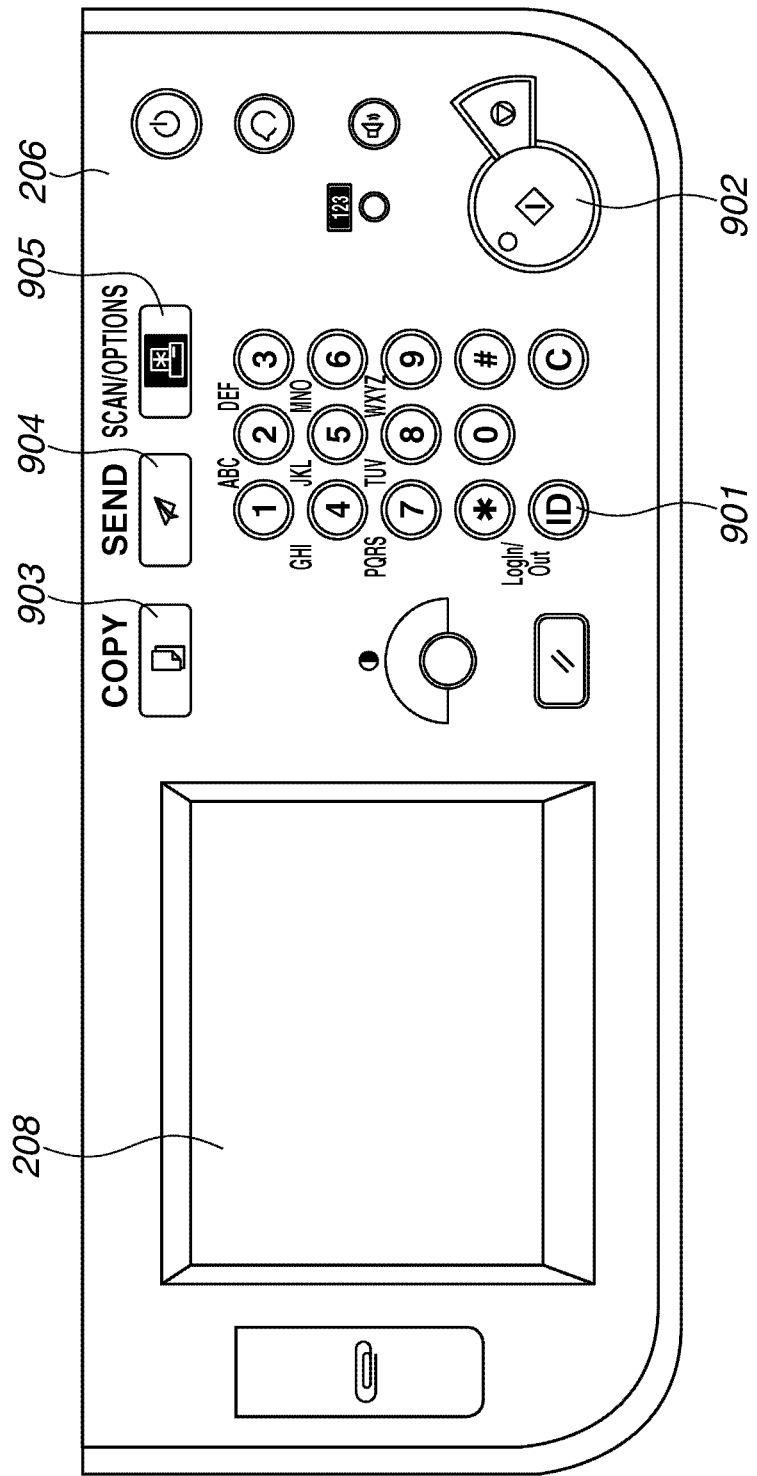
FIG. 9 illustrates an example of an overview of a panel 206 and the display 208.

A DISPC 207 controls image drawing applied to the DISPLAY 208. The DISPLAY 208 is constituted by, for example, a liquid crystal display, and displays an operation screen of the MFP 200. The operation unit of the MFP 200 is constituted by the PANEL 206 and the DISPLAY 208. FIG. 9 illustrates an example of the operation unit according to the present exemplary embodiment.

Referring to FIG. 9, a part of the PANEL 206 is constituted by an ID key 901, a START key 902, a COPY key 203, and a SEND key 904. Further, a touch panel sheet is mounted on the surface of the DISPLAY 208. The keys will be described in more detail below.

Again referring to FIG. 2, the NIC 204 is in charge of exchanges of data with another MFP, a file server (not illustrated), or the LDAP server 300 via the LAN 100. The PRINTER 211 forms an image on a recording sheet by the electrophotographic method. The SCANNER 212 reads an image printed on a recording sheet. The SCANNER 212 is equipped with an auto document feeder (not-illustrated), and thereby can automatically read a plurality of documents.

The MFP 200 according to the present exemplary embodiment is configured to perform the device authentication, and the send authentication as an example of the function authentication. The device authentication is realized by storing an authentication table containing department IDs and passwords in the HD 210 of the MFP 200, and by checking a department ID and a password input by a user against the table.

For the send authentication, the MFP 200 communicates with the LDAP server 300 via the LAN 100 to authenticate a user. In the present exemplary embodiment, a user authenticated by the device authentication is allowed to use the MFP 200, and use the copy function and the print function of the MFP 200 which do not require the function authentication.

Further, a user authenticated by the send authentication is allowed to use the send function of the MFP 200. In each of the device authentication and the send authentication, if a user does not operate the PANEL 206 for a predetermined time after the user is authenticated (after the user logs in), the authentication status is changed from an authenticated status to an unauthenticated status (logout state).

This "predetermined time period" is set to the MFP 200 in advance, and a timer (auto-logout timer) in the form of software counts this time period. The auto-logout timer may be mounted in the form of hardware. In this case, when the auto-logout timer detects that the predetermined time has passed, an interrupt signal is issued to the CPU 201. The details thereof will be described below.

Next, an example of the processing performed by the MFP 200 according to the present exemplary embodiment will be described with reference to FIGS. 3 to 5.

Figure 3:
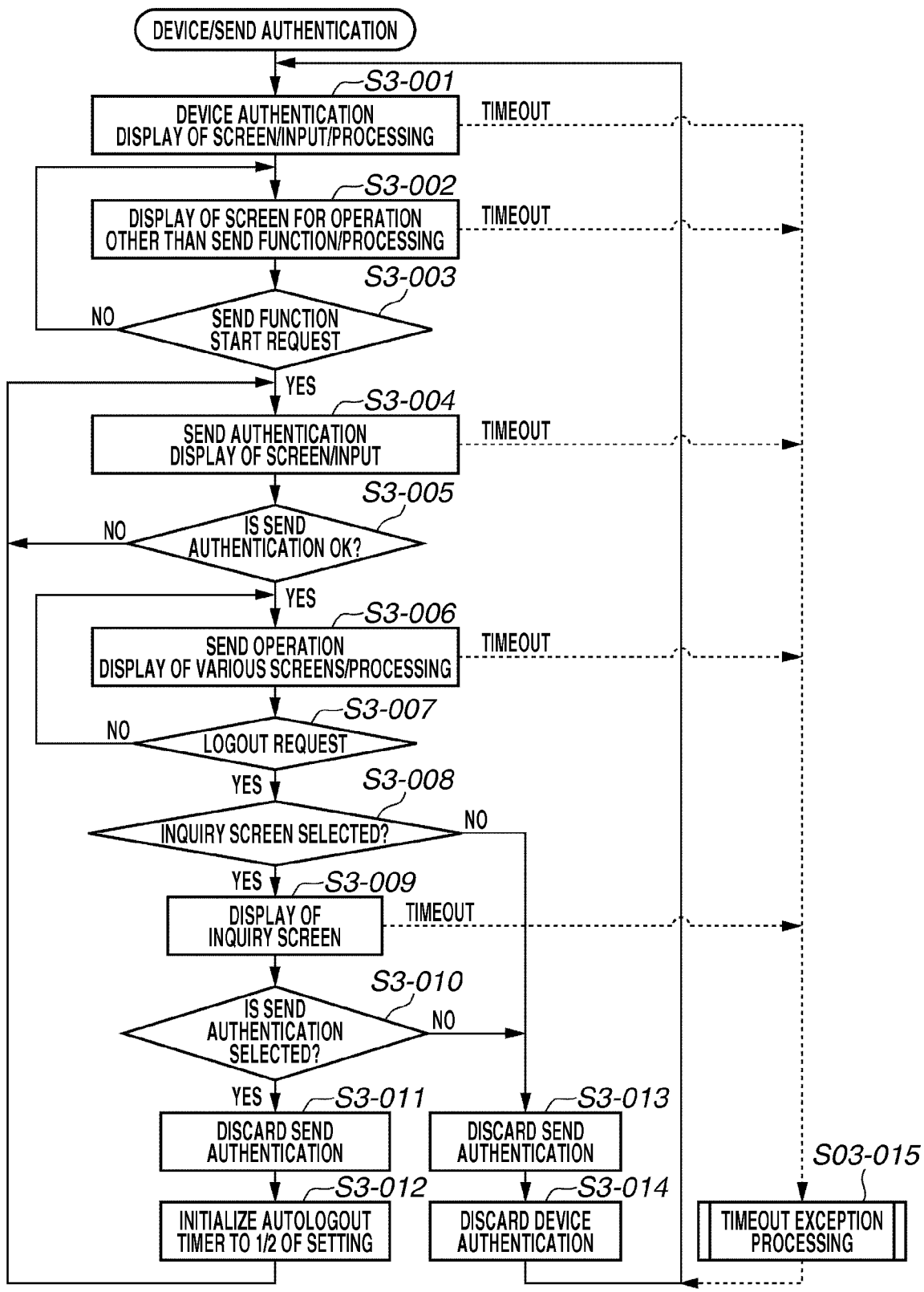
FIG. 3 is a flowchart illustrating an example of processing of the device authentication and the send authentication in the MFP 200.

FIG. 3 is a flowchart illustrating an example of the device authentication processing and the send authentication processing according to the present exemplary embodiment.

A program required for executing this flowchart is stored in the HD 210, is expanded into the RAM 203 when the power source of the MFP 200 is turned on, and then is executed by the CPU 201. The processing of the flowcharts that will be described below is realized in the same manner.

Figure 6:
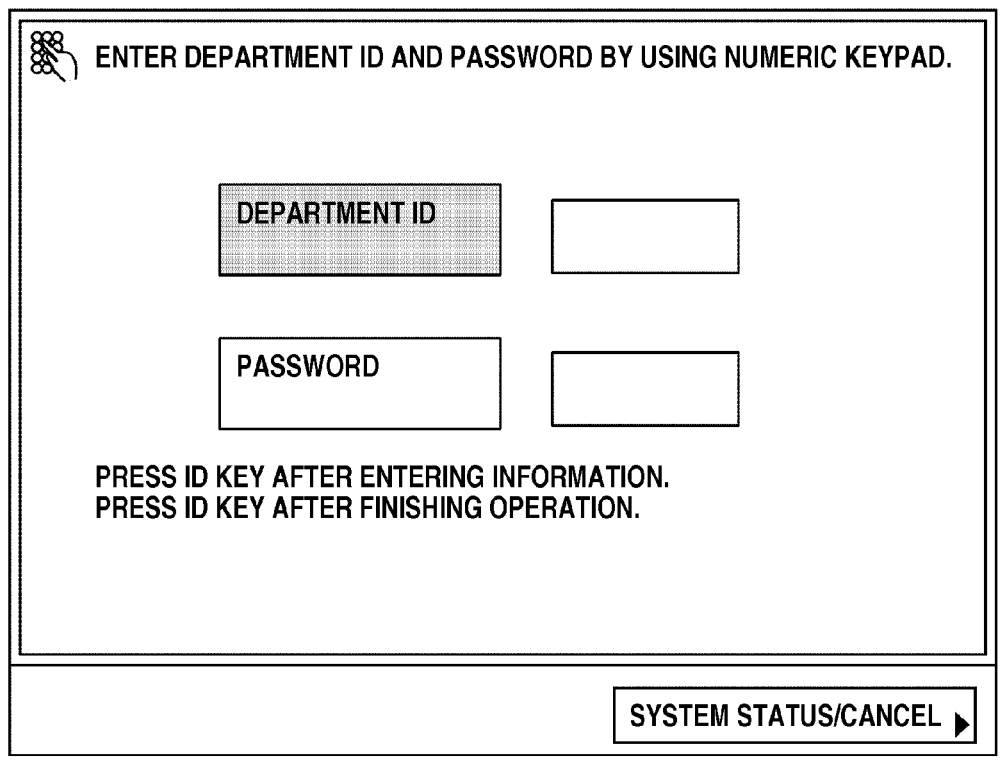
FIG. 6 illustrates an example of a screen prompting an input of a department ID and password for the device authentication.

In step S3-001, an authentication screen is displayed on the DISPLAY 208, so that the MFP 200 is set in a ready state for receiving a department ID and a password for the device authentication. FIG. 6 illustrates an example of a screen for the device authentication, which is displayed on the DISPLAY 208.

Then, the CPU 201 waits for a user to enter his/her department ID and password on the PANEL 206, and then waits for the user to press the ID key 901 (FIG. 9) to issue a login request to the device authentication.

When the ID key 901 is pressed, the CPU 201 checks the entered department ID and password against the above-described authentication table stored in the HD 210 to determine whether the entered department ID and password are appropriate. If they are appropriate, the processing proceeds to step S3-002, and if not, step S3-001 is repeated.

Next, in step S3-002, an operation screen for the copy function (copy screen) is displayed. At this time, when the user operates the PANEL 206, the processing proceeds to step S3-003.

In step S3-003, the CPU 201 determines whether a start request for the send function is issued. More specifically, the CPU 201 determines whether the key operated by the user is the SEND key 904 (FIG. 9). If the key operated by the user is the SEND key 904 (YES in step S3-003), the processing proceeds to step S3-004. If the key operated by the user is not the SEND key 904 (NO in step S3-003), the processing returns to step S3-002 in which the CPU 201 performs processing according to a user's operation (for example, processing for the copy function), and then waits for the next operation.

In step S3-004, the CPU 201 displays, on the DISPLAY 208, a screen prompting the user to enter his/her username and password for the send authentication as an example of the function authentication. FIG. 7 illustrates an example of the screen displayed at this time on the DISPLAY 208.

Subsequently, the CPU 201 receives the username and password that the user enters by operating the PANEL 206. Further, the CPU 201 waits for the user's pressing of a login button 702 which corresponds to a login request for the send authentication. When the user presses the login button 702, the CPU 201 accesses the LDAP server 300 via the LAN 100.

More specifically, the CPU 201 requests the authentication by sending the entered username and password to the LDAP server 300 by using the predetermined protocol. Upon a reception of the request, the LDAP server 300 checks the sent username and password, and returns the authentication result to the MFP 200 by using the predetermined protocol. After the MFP 200 receives the authentication result, the processing proceeds to step S3-005.

In step S3-005, the CPU 201 determines whether the authentication result of the send authentication indicates that the user can be successfully authenticated. If the authentication result indicates that user can be successfully authenticated (YES in step S3-005), the processing proceeds to step S3-006. If not (NO in step S3-005), an authentication failure is displayed on the DISPLAY 208, and the processing returns to step S3-004.

In step S3-006, an operation screen for performing the send function is displayed. At this time, when the user operates the PANEL 206 illustrated in FIG. 2, the processing proceeds to step S3-007.

In step S3-007, the CPU 201 determines whether the operated key is a logout request. More specifically, the CPU 201 determines whether the operated key is the ID key 901 illustrated in FIG. 9. If the operated key is the ID key 901 (YES in step S3-007), the processing proceeds to step S3-008. If the operated key is not the ID key 901 (NO in step S3-007), then the processing returns to step S3-006 in which the CPU 201 performs the send function according to the received operation, and waits for the next operation.

In step S3-008, the CPU 201 checks whether the setting to display an inquiry screen is selected in the MFP 200. If the MFP 200 is set to display the inquire screen (YES in step S3-008), the processing proceeds to step S3-009.

Figure 8:
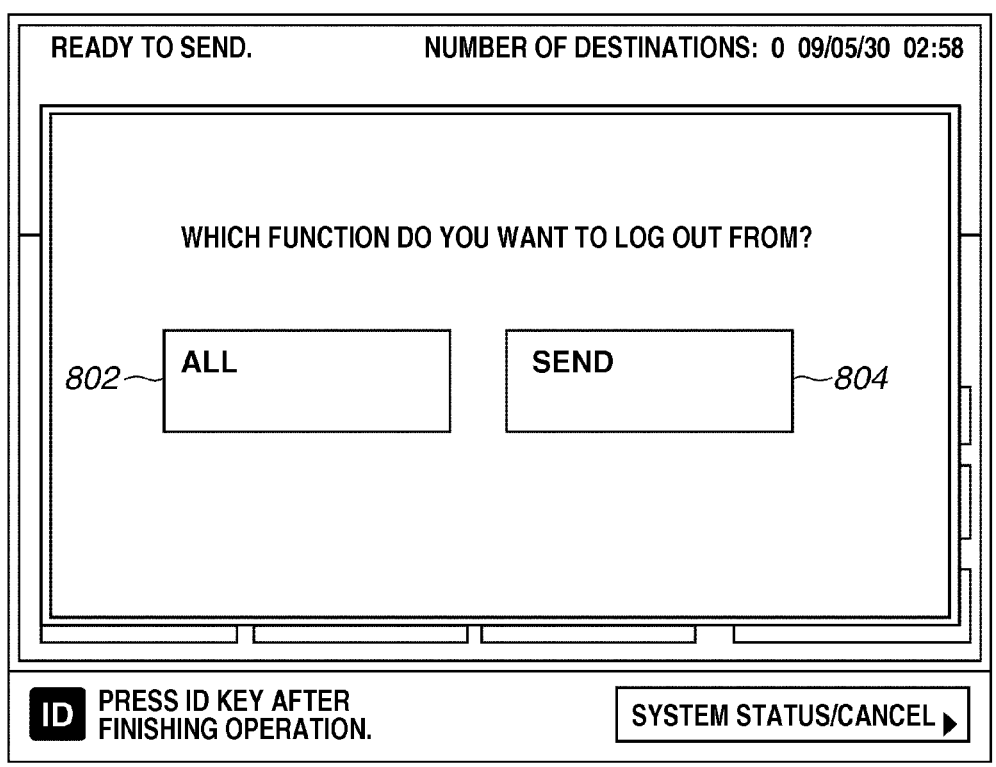
FIG. 8 illustrates an example of an inquiry screen displayed on a display 208.

In step S3-009, the CPU 201 displays a screen inquiring whether the user wants to log out from both of the device authentication and the send authentication, or the user wants to log out from only the send authentication. FIG. 8 illustrates an example of the inquiry screen displayed on the DISPLAY 208.

Subsequently, the CPU 201 waits for the user to operate the PANEL 206. When the user operates the PANEL 206, the processing proceeds to step S3-010. With this arrangement, the MFP 200 can allow a user to log out from arbitrary authentication without having logout buttons or the like respectively dedicated to a plurality of kinds of authentication.

In step S3-010, the CPU 201 determines whether the user selects logouts from both of the device authentication and the send authentication (an "ALL" button 802 illustrated in FIG. 8), or the user selects a logout only from the send authentication (a "SEND" button 804 illustrated in FIG. 8) by operating the PANEL 206. If the CPU 201 determines that the user selects a logout only from the send authentication (YES in step S3-010), the processing proceeds to step S3-011.

In step S3-011, the CPU 201 discards the send authentication information such as the user name entered in step S3-004 (this process sets the user in a logout state from the send authentication), and the processing proceeds to step S3-012.

In step S3-012, the CPU 201 reinitializes the auto-logout timer value to a half (½) of a predetermined set value t. Then, the processing returns to step S3-004.

In this state, the user has logged out from the send authentication, but is still in a login state to the device authentication. In this state, even if the user mistakenly believes that the user also has logged out from the device authentication, and leaves the MFP 200, since the auto-logout from the device authentication is set to work in a shorter time than the time until a normal auto-logout situation, it is possible to reduce the possibility that another user may use the MFP 200. Therefore, it is possible to reduce an occurrence of a job that a person requests by using a false identity.

Further, after the user logs out from the send authentication, the device authentication is maintained for a t/2 time. Therefore, after the logout from the send authentication, the user can subsequently perform an operation to utilize another function (for example, the copy function) that does not require the function authentication.

In the present exemplary embodiment, 2 minutes is set as the auto-logout timer value t. Then, the MFP 200 is configured in such a manner that a user or an administrator can change this timer value within a range from 0 to 9 minutes. In the present exemplary embodiment, the timer value t of 0 means that the auto-logout is set to not work.

In this case, the value of t/2 set in step S3-012 is also 0, and the auto-logout is also set not to work. The value of the timer value t may be another value, and the changeable range thereof may be different.

On the other hand, if the CPU 201 determines in step S3-008 that the setting not to display the inquiry screen is selected in the MFP 200 (NO in step S3-008), or if the CPU 201 determines in step S3-010 that the user selects logouts from both of the device authentication and the send authentication (NO in step S3-010), then the processing proceeds to step S3-013.

In step S3-013, similarly to step S3-011, the CPU 201 discards the send authentication information such as the username entered in step S3-004, and then the processing proceeds to step S3-014.

In step S3-014, the CPU 201 discards the device authentication information such as the department ID entered in step S3-001 (this process sets the user in a logout state from the device authentication), and then the processing returns to step S1-001.

In addition, if a timeout of the auto-logout occurs in step S3-001, S3-002, S3-004, S3-006, and S3-009, the CPU 201 performs timeout exception processing in step S3-015 which will be described below.

Figure 4:
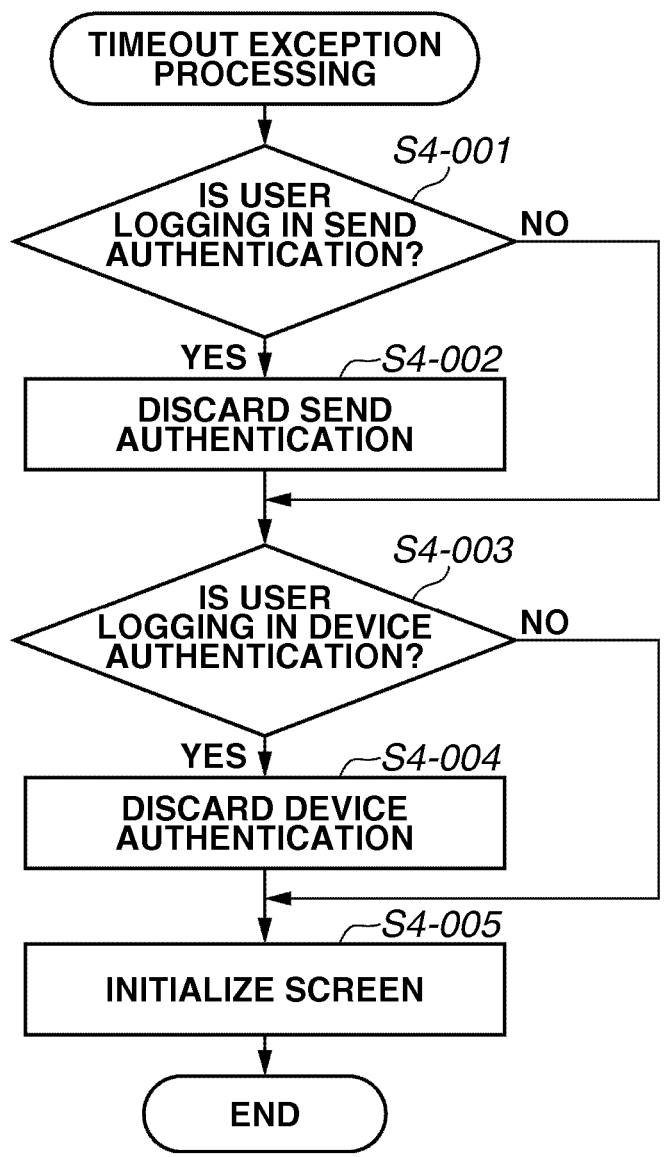
FIG. 4 is a flowchart illustrating an example of timeout exception processing.

FIG. 4 is a flowchart illustrating the timeout exception processing performed in step S3-015 illustrated in FIG. 3.

In step S4-001, the CPU 201 determines whether the MFP 200 maintains the user authentication by the send authentication, i.e., the user is logging in the send authentication. If the user is logging in the send authentication (YES in step S4-001), the processing proceeds to step S4-002, and if not (NO in step S4-001), the processing proceeds to step S4-003.

In step S4-002, the CPU 201 discards the send authentication information such as the username entered in step S3-004 (this process sets the user in a logout state from the send authentication), and the processing proceeds to step S4-003.

In step S4-003, the CPU 201 determines whether the MFP 200 maintains the user authentication by the device authentication, i.e., the user is logging in the device authentication. If the user is logging in the device authentication (YES in step S4-003), the processing proceeds to step S4-004, and if not (NO in step S4-003), the processing proceeds to step S4-005.

In step S4-004, the CPU 201 discards the device authentication information such as the department ID entered in step S3-001 (this process sets the user in a logout state from the device authentication), and the processing proceeds to step S4-005.

In step S4-005, the CPU 201 initializes the screen and the like displayed on the DISPLAY 208 (for example, the CPU 201 displays the screen that is displayed immediately after the power source of the MFP 200 is turned on), and this flowchart is ended. Further, if the timer set value of the auto-logout timer at this time is changed to t/2, the set value is reset to t, which is an initial value.

Figure 5:
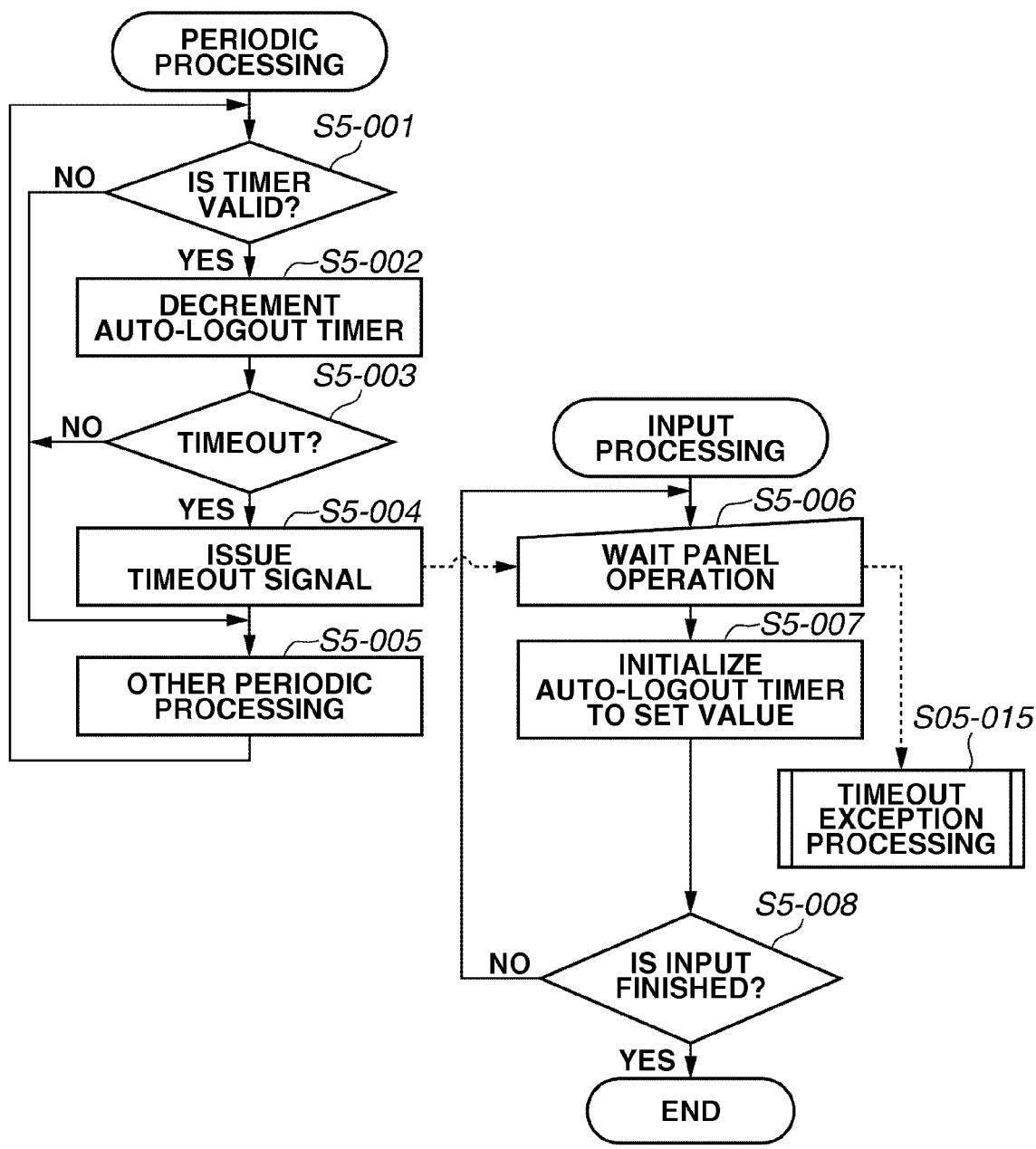
FIG. 5 is a flowchart illustrating an example of timeout processing and an example of input processing.

FIG. 5 is a flowchart illustrating the timeout processing and the input processing performed in step S3-001, S3-002, S3-004, S3-006, and S3-009 illustrated in FIG. 3. The CPU 201 executes this flowchart in parallel with the flowcharts illustrated in FIGS. 3 and 4.

The auto-logout timeout processing is constituted by periodic processing and input processing.

Steps S5-001 to S5-005 constitute the periodic processing that is periodically carried out. Steps from step S5-006 to step S5-008 constitute the input processing for receiving a user's operation of the PANEL 206.

First, the periodic processing will be described. In step S5-001, the CPU 201 determines whether the timer value of the auto-logout timer is valid. If the CPU 201 determines that the timer value is valid (YES in step S5-001), the processing proceeds to step S5-002.

In step S5-002, the CPU 201 reduces the timer value of the auto-logout timer, and then the processing proceeds to step S5-003. The timer value of the auto-logout timer is reduced, starting from the initial value t (or t/2).

In step S5-003, the CPU 201 determines whether the timer value of the auto-logout timer reaches a timeout (the timer value is 0). If the CPU 201 determines that the timer value reaches a timeout (YES in step S5-003), the processing proceeds to step S5-004.

In step S5-004, the CPU 201 issues a signal indicating an occurrence of a timeout to the input processing being carried out in parallel with the periodic processing.

Subsequently, in step S5-005, the CPU 201 performs periodic processing other than the auto-logout timer processing (for example, auto-clear processing of returning a set value selected on the PANEL 206 to an initial value when any operation is not performed to the PANEL 206 for a predetermined time). Then, the processing returns to step S5-001.

On the other hand, if the CPU 201 determines, in step S5-001, that the timer value is invalid (NO in step S5-001), or if the CPU 201 determines, in step S5-003, that the timer value does not reach a timeout (NO in step S5-003), the processing proceeds to step S5-005.

Next, the input processing will be described. The input processing is performed when the CPU 201 waits for the user to operate the PANEL 206, for example, in steps S3-001, S3-002, S3-004, S3-006, and S3-009 illustrated in FIG. 3.

In step S5-006, the CPU 201 waits for the user to operate the PANEL 206. When the user operates the PANEL 206, the processing proceeds to step S5-007.

In step S5-007, the CPU 201 initializes the auto-logout timer value to the set value t, and then the processing proceeds to step S5-008. As a result, the time during which the user does not perform any operation is reset.

In step S5-008, the CPU 201 determines whether a user's input operation to the PANEL 206 is finished. For example, in step S3-001 in FIG. 3, the CPU 201 determines that the input is finished when the user enters the department ID and the password illustrated in FIG. 6, and presses the ID key 901 illustrated in FIG. 9. If the CPU 201 determines that the input is finished (YES in step S5-008), the input processing is ended. If CPU 201 determines that the input is not finished (NO in step S5-008), the processing returns to step S5-006.

In step S5-006, the CPU 201 simultaneously checks the signal indicating a timeout from step S5-004 of the periodic processing. If the signal is transmitted, the processing jumps to step S3-015 in FIG. 3, and the timeout exception processing is performed.

The execution of the flowcharts illustrated in FIGS. 3 to 5 enables the MFP 200 to set the initial value (for example, t, which corresponds to a first time) of the auto-logout timer on the screen immediately after a user logs out from the function authentication to a smaller value (for example, t/2, which corresponds to a second time) than the initial value for a normal situation.

Then, if the user performs any operation within the shortened time, the initial value of the auto-logout timer is returned to t again. As a result, it is possible to reduce the time that the MFP 200 is left unoperated while the login state to the device authentication is maintained after the logout from the function authentication. Accordingly, it is possible to make it difficult for another user to operate the MFP 200 by using a false identity.

Further, the display of the inquiry screen in step S3-009 enables a user to log out from desired authentication even without the provision of an operation button configured by a key in the form of hardware, which functions to allow a logout, for each of the plurality of kinds of authentication.

Further, a user can instruct logouts from both of the device authentication and the function authentication on the inquiry screen, which results in simplification of the operation for logging out from each of the plurality of kinds of authentication. In addition, since a user can log out from all kinds of authentication by this operation, it can be prevented that the user leaves the MFP 200 while being still logging in the device authentication.

The first exemplary embodiment has been described based on an example of the MFP 200 in which, out of the plurality of functions provided to the MFP 200, the send function is the function requiring the function authentication. A second exemplary embodiment will be described based on an example of the MFP 200 in which the print function requires the function authentication in addition to the send function. The MFP 200 according to the second exemplary embodiment has similar hardware configuration to the hardware configuration of the first exemplary embodiment, and the system configuration including the MFP 200 according to the second exemplary embodiment is also similar to the system configuration of the first exemplary embodiment.

Figure 10A:
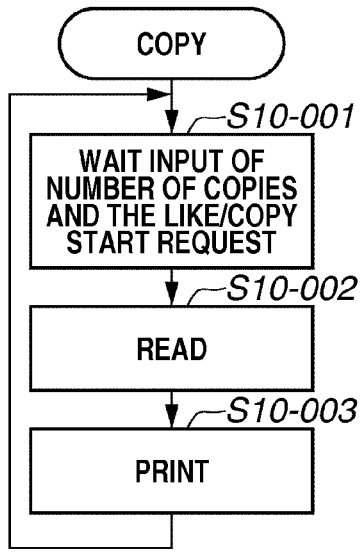
FIGS. 10A, 10B, and 10C are flowcharts illustrating examples of three functions of the MFP 200 and processing of each function.
Figure 10B:
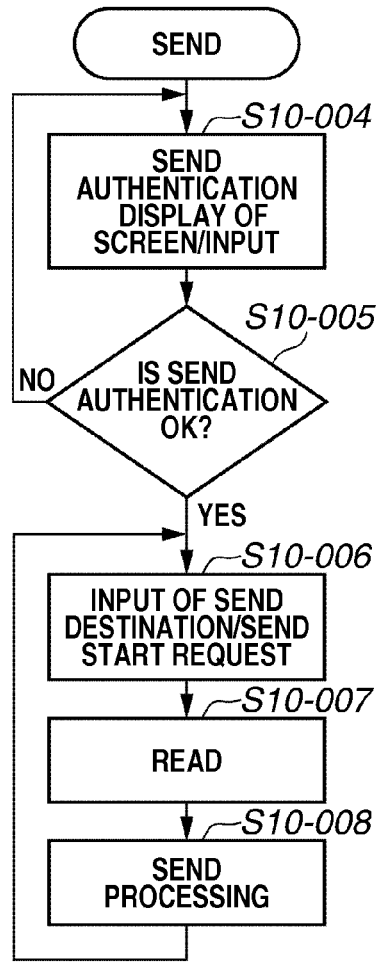
Figure 10C:
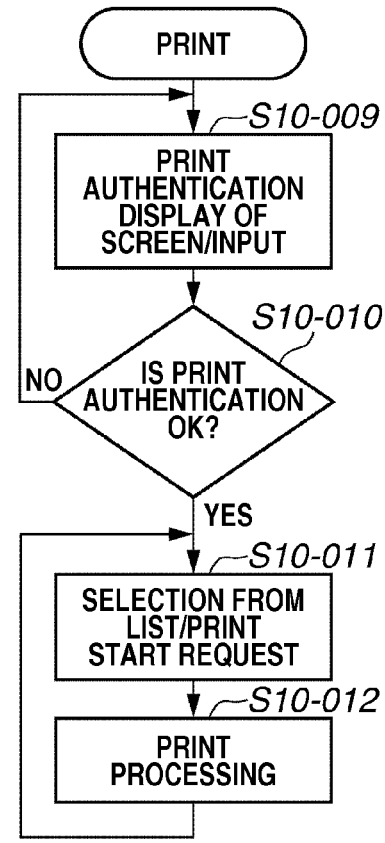

FIGS. 10A, 10B, and 10C are flowcharts illustrating examples of three functions of the MFP 200 according to the second exemplary embodiment, and processing of the respective functions. The programs required for execution of the three functions illustrated in FIGS. 10A, 10B, 10C are stored in the HD 210 or the ROM 202. The CPU 201 of the MFP 200 executes the corresponding program, whereby the flowcharts are realized.

FIG. 10A illustrates the processing of the copy function. The copy function can be carried out without requiring the function authentication. Therefore, a user can use the copy function by just logging in the device authentication of the MFP 200.

In step S10-001, the CPU 201 displays, on the DISPLAY 208, a screen prompting a user to enter setting information required to carry out the copy function, such as a number of copies, and then receives a user's input by using the PANEL 206. Further, the CPU 201 waits for the user to instruct a copy start (press the START key 902 illustrated in FIG. 9).

Upon a reception of an instruction of a copy start, the processing proceeds to step S10-002 in which the SCANNER 212 reads an original document set on the SCANNER 212.

After completion of the reading, the processing proceeds to step S10-003 in which the PRINTER 211 prints the contents of the read document on a sheet. After completion of the print, the processing returns to step S10-001.

FIG. 10B illustrates the send authentication, which is one of the function authentication, and the processing of the send function. The send function in the second exemplary embodiment is similar to the send function in the first exemplary embodiment.

Steps S10-004 and S10-005 are the same as steps S3-004 and S3-005 in the first exemplary embodiment illustrated in FIG. 3, and therefore the descriptions thereof will be omitted. When the user is successfully authenticated by the send authentication in step S10-005 (YES in step S10-005), the processing proceeds to step S10-006.

In step S10-006, the CPU 201 displays a screen prompting the user to enter, for example, a send destination on the DISPLAY 208, and receives a user's input by using the PANEL 206. Further, the CPU 201 waits for the user to instruct a send start (the CPU 201 waits for the user to press the START key 902 illustrated in FIG. 9). Upon a reception of the start instruction, the processing proceeds to step S10-007 in which the SCANNER 212 reads an original document set on the SCANNER 212.

After completion of the reading, the processing proceeds to step S10-008 in which the data of the read document is sent to the specified destination, and then the processing returns to step S10-006. After the start of the send processing in step S10-008, the send processing can be continued in the background while the user is operating the PANEL 206 to carry out another function.

FIG. 10C illustrates the print authentication, which is another function authentication, and the processing of the print function. In the second exemplary embodiment, the print function also requires the function authentication. Hereinafter, the term "print authentication" is used to refer to the function authentication performed to allow a user to use the print function.

In step S10-009, the CPU 201 displays, on the DISPLAY 208, a screen prompting a user to enter his/her username and password required for the print authentication. More specifically, the CPU 201 displays the screen illustrated in FIG. 7 with the domain name field removed therefrom. Subsequently, the CPU 201 receives the username and password that the user enters by operating the PANEL 206. Further, the CPU 201 waits the user's pressing of the login button 702 which corresponds to a request for logging in to the print authentication. When the user presses the login button 702, the processing proceeds to step S10-010.

In step S10-010, the CPU 201 checks the entered username and password against an authentication table for the print authentication, which is stored in the HD 210 and constituted by usernames and passwords, to determine whether the entered username and password are appropriate. If they are appropriate (YES in step S10-010), the processing proceeds to step S10-011, and if not (NO in step S10-010), the step S10-009 is repeated.

In step S10-011, the CPU 201 extracts only the print jobs sent by the user authenticated by the print authentication, from print jobs received from, for example, not-illustrated client personal computers (PCs) connected via the LAN 100, and displays the extracted print jobs in the form of a list on the DISPLAY 208. Further, the CPU 201 prompts the user to select any job from the listed jobs. Then, the CPU 201 receives a user's selection by using the PANEL 206. Further, the CPU 201 waits for the user to instruct a print start (the CPU 201 waits for the user to press the START key 902 illustrated in FIG. 9).

Upon a reception of the start request, the processing proceeds to step S10-012 in which the PRINTER 211 prints the selected job. Then, the processing returns to step S10-011. After the start of the print processing in step S10-012, the print processing can be continued in the background while the user is operating the PANEL 206 to carry out another function.

Pressing the COPY key 903 illustrated in FIG. 9 causes the display on the DISPLAY 208 to be changed to the screen associated with the copy function illustrated in FIG. 10A. Pressing the SEND key 904 causes the display on the DISPLAY 208 to be changed to the screen associated with the send processing illustrated in FIG. 10B.

Pressing the SCAN/OPTIONS key 905 causes the display on the DISPLAY 208 to be changed to the screen associated with the print processing illustrated in FIG. 10C. The processing of the copy function, the processing of the send function, and the processing of the print function are continued in the background, even when the screen displayed on the DISPLAY 208 is changed to another screen unrelated to that function after an instruction to start the processing is issued. In this case, when the screen is returned to the one associated with that function, the DISPLAY 208 displays the screen according to the step that the processing reaches at this moment while being continued in the background.

Further, when a timeout by the auto-logout timer occurs in steps S10-001, S10-004, S10-006, S10-009, and S10-011, which are not illustrated in FIGS. 10A to 10C, the CPU 201 performs timeout exception processing that will be described below. The mechanism for a timeout by the auto-logout timer is the same as the mechanism of the flowchart illustrated in FIG. 5. A signal is notified to the function currently displaying the screen therefor and waiting a user's input.

FIG. 11 is a flowchart illustrating the details of a flow of logout processing in the second exemplary embodiment. The CPU 201 of the MFP 200 carries out the flowchart illustrated in FIG. 11. When a user presses the ID key 901 illustrated in FIG. 9, the CPU 201 interrupts the processing of waiting a panel operation, for example, in step S5-006 in FIG. 5, and performs the logout processing illustrated in FIG. 11.

In step S11-001, the CPU 201 determines whether there is the function authentication that a user is logging in. If there is the function authentication that the user is logging in (YES in step S11-001), the processing proceeds to step S11-002, and if not (NO in step S11-001), the logout processing is ended.

In step S11-002, the CPU checks the login state. If the user is logging in only the send authentication (ONLY SEND AUTHENTICATION in step S11-002), the processing proceeds to step S11-008. If the user is logging in only the print authentication (ONLY PRINT AUTHENTICATION in step S11-002), the processing proceeds to step S11-010. If the user is logging in both the send authentication and the print authentication (BOTH in step S11-002), the processing proceeds to step S11-003.

Figure 13:
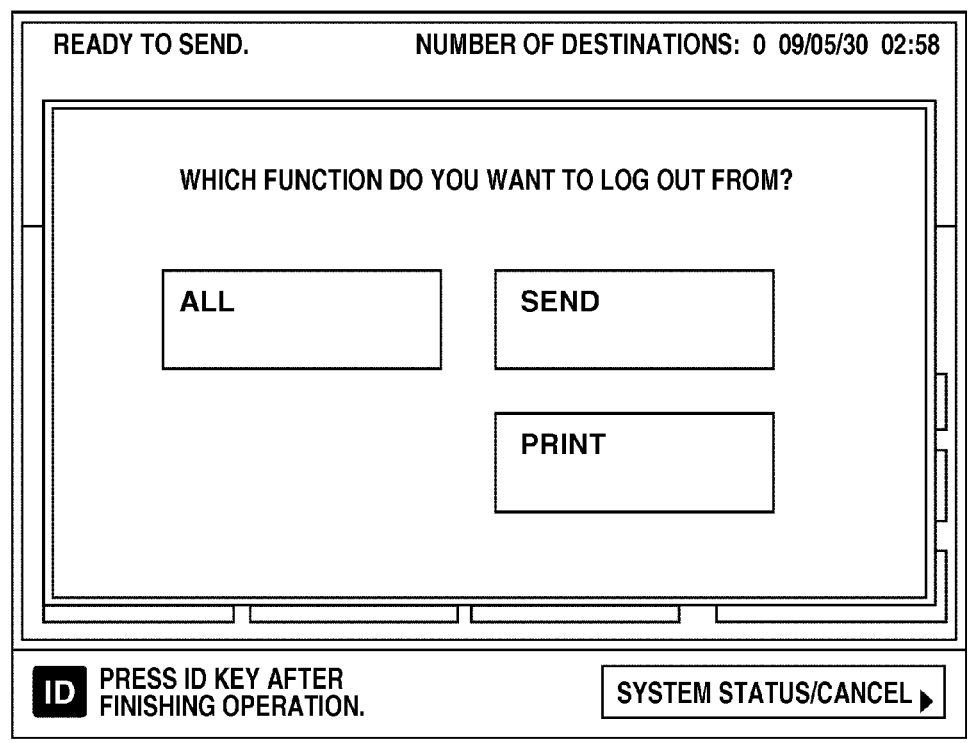
FIG. 13 illustrates an example of an inquiry screen according to the second exemplary embodiment.

In step S11-003, the CPU 201 displays a screen inquiring the user whether the user wants to log out from both the send authentication and the print authentication, the user wants to log out from only the send authentication, or the user wants to log out from only the print authentication. FIG. 13 illustrates an example of the inquiry screen displayed on the DISPLAY 208 in step S11-003.

Then, the CPU 201 waits for the user to operate the PANEL 206. When the user operates the PANEL 206, the processing proceeds to step S11-004. With this arrangement, the MFP 200 can allow a user to log out from desired authentication without having buttons or the like respectively dedicated to the plurality of kinds of function authentication.

In the first exemplary embodiment, the MFP 200 is configured to display the inquiry screen according to the setting about whether to make an inquiry. In the second exemplary embodiment, the MFP 200 may be configured to always display the inquiry screen.

In step S11-004, the CPU 201 determines whether the user's operation of the PANEL 206 indicates a selection of logouts from both the send authentication and the print authentication, a selection of a logout from only the send authentication, or a selection of a logout from only the print authentication.

If the user presses an "ALL" button illustrated in FIG. 13, the CPU 201 determines that the user selects logouts from both the send authentication and the print authentication (ALL in step S11-004), and then the processing proceeds to step S11-005. If the user presses a "SEND" button illustrated in FIG. 13, the CPU 201 determines that the user selects a logout from only the send authentication (SEND AUTHENTICATION in step S11-004), and then the processing proceeds to step S11-007. If the user presses a "PRINT" button illustrated in FIG. 13, the CPU 201 determines that the user selects a logout from only the print authentication (PRINT AUTHENTICATION in step S11-004), and then the processing proceeds to step S11-009.

In step S11-005, the CPU 201 discards the authentication information for the send authentication such as the user name entered in step S10-004 in FIG. 10 (this process sets the user in a logout state from the send authentication). Then, the CPU 201 transmits a signal indicating a logout from the send authentication to the program performing the send processing, and the processing proceeds to step S11-006.

Upon a reception of the signal indicating a logout from the send authentication, the program performing the send processing illustrated in FIG. 10B initializes the state regarding the send function, including, for example, the operation screen displayed on the PANEL 206 for the send function, and then the processing returns to step S10-004. If the program is sending image data at the moment of the reception of the logout signal, the program continues this sending.

In step S11-006, the CPU 201 discards the authentication information for the print authentication such as the username entered in step S10-009 in FIG. 10 (this process sets the user in a logout state from the print authentication). Then, the CPU 201 transmits a signal indicating a logout from the print authentication to the program performing the print processing, and then the present flowchart is ended.

Upon a reception of the signal indicating a logout from the print authentication, the program performing the print processing illustrated in FIG. 10C initializes the state regarding the print function, including, for example, the operation screen displayed on the PANEL 206 for the print processing, and then the processing returns to step S10-009. If the program is performing the print processing at the moment of the reception of the logout signal, the program continues the print processing.

On the other hand, if the CPU 201 determines in step S11-004 that the user selects a logout from only the send authentication (SEND AUTHENTICATION in step S11-004), the processing proceeds to S11-007. In step S11-007, the CPU 201 reinitializes the preset set value t of the auto-logout timer to t/n based on a preset divider n. Then, the processing proceeds to step S11-008.

In the first exemplary embodiment, the MFP 200 is configured to reinitialize the set value to a half of the set value unconditionally. However, in the second exemplary, the MFP 200 is configured to allow a user to set the divider n, and reinitialize the set value according to the divider. Therefore, it is possible to achieve a more flexible setting of the time for the auto-logout.

In step S11-008, the CPU 201 performs the same processing as the processing in step S11-005, and the logout processing is ended. The detailed description thereof is omitted here.

Step S11-009 is performed when the CPU 201 determines in step S11-004 that the user selects a logout from only the print authentication. The contents of the processing in this step are the same as step S11-007. The detailed description thereof is omitted here. Subsequently, the processing proceeds to step S11-010.

In step S11-010, the CPU 201 performs the same processing as the processing in step S11-006, and the logout processing is ended. The detailed description thereof is omitted here.

According to the flowchart illustrated in FIG. 11, for example, even if a user mistakenly logs out from only one kind of function authentication by an operational mistake, it is possible to reduce as much as possible the possibility that another user may use the other function maintaining a login state by the function authentication.

FIG. 12 is a flowchart illustrating timeout exception processing in the second exemplary embodiment. When a timeout by the auto-logout timer occurs in steps S10-001, S10-004, S10-006, S10-009, and S10-011, the CPU 201 starts the timeout exception processing illustrated in FIG. 12.

In step S12-001, the CPU 201 determines whether the user is logging in the send authentication. If the user is logging in the send authentication (YES in step S12-001), the processing proceeds to step S12-002, and if not (NO in step S12-001), the processing proceeds to step S12-003.

In step S12-002, similarly to step S11-005 in FIG. 11, the CPU 201 discards the send authentication information such as the username entered in step S10-004. This step sets the user in a logout state from the send authentication. In addition, the CPU 201 transmits a signal indicating a logout from the send authentication to the program for performing the send processing. Then, the processing proceeds to step S12-003.

Upon a reception of the signal indicating a logout from the send authentication, the program performing the send processing illustrated in FIG. 10B initializes the state regarding the send function, including, for example, the operation screen displayed on the PANEL 206 for the send function, and then the processing returns to step S10-004. If the program is sending image data at the moment of the reception of the logout signal, the program continues this sending.

In step S12-003, the CPU 201 determines whether the user is logging in the print authentication. If the user is logging in the print authentication (YES in step S12-003), the processing proceeds to step S12-004, and if not (NO in step S12-003), the processing proceeds to step S12-005.

In step S12-004, similarly to step S11-006 in FIG. 11, the CPU 201 discards the print authentication information such as the username entered in step S10-009. This step sets the user in a logout state from the print authentication. Further, the CPU 201 transmits a signal indicating a logout from the print authentication to the program for performing the print processing, and then the processing proceeds to step S12-005.

Upon a reception of the signal indicating a logout from the print authentication, the program performing the print processing illustrated in FIG. 10C initializes the state regarding the print function, including, for example, the operation screen displayed on the PANEL 206 for the print processing, and then the processing returns to step S10-009. If the program is performing the print processing at the moment of the reception of the logout signal, the program continues the print processing.

In step S12-005, the CPU 201 transmits a timeout signal to the program for performing the copy processing, and the timeout exception processing is ended. The program for the copy processing, which receives the timeout signal while performing the processing illustrated in FIG. 10A, initializes the state regarding the copy function, including, for example, the operation screen displayed on the PANEL 206 for the copy processing, and then the processing returns to step S10-001.

According to the second exemplary embodiment as described above, the MFP 200 is configured to set, to t/n, only the auto-logout timer on the screen immediately after a user logs out from only one of the function authentication. If the user performs any operation on that screen, the auto-logout timer is returned to the set value t.

As a result, it is possible to reduce the time that the MFP 200 is left unoperated while the login state to the device authentication is maintained after the logout from the function authentication. Therefore, it is possible to make it difficult for another user to operate the MFP 200 by using a false identity.

Further, the display of the inquiry screen in step S11-003 enables a user to log out from desired authentication without the provision of an operation button configured by a key in the form of hardware, which functions to allow a logout, for each of the plurality of kinds of authentication.

Further, a user can instruct logouts from both the device authentication and the function authentication on the inquiry screen, which results in simplification of the operation for logging out from each of the plurality of kinds of authentication.

The first exemplary embodiment has been described assuming that the function becoming available by the function authentication is the send authentication of the MFP 200. However, the function becoming available by the function authentication maybe another specific function provided to the MFP 200.

The first exemplary embodiment has been described based on an example of the device authentication using a department ID. However, the device authentication is not limited to the authentication using a department ID. Similarly to the print authentication in the second exemplary embodiment, the device authentication may be authentication using a username and/or a user ID.

Further, the first and second exemplary embodiments have been described based on an example of the authentication method using the authentication table stored in the HD 210, and the authentication method using the LDAP server 300. However, the authentication method is not limited thereto. For example, the authentication method may be embodied by biometric authentication or user authentication using, for example, an integrated circuit (IC) card (contact type or non-contact type). Further, the user authentication method may be embodied by an authentication method using a server such as the LDAP server 300, or an authentication method processed within the MFP 200.

Further, the first exemplary embodiment is configured to set, to ½, only the auto-logout timer on the screen immediately after a logout from the function authentication. The second exemplary embodiment is configured to set, to 1/n, only the auto-logout timer on the screen immediately after a logout from only one of the function authentication. However, the method for determining the set value is not limited to the method based on a division. A user may select a set value t2 in such a manner that t>t2 is satisfied in which t represents a normal auto-logout timer value, or an administrator or the like may set such a set value t2 to the MFP 200 in advance.

Further, the first and second exemplary embodiments have been described based on an example of the configuration having the constantly working auto-logout function. However, the auto-logout function may not constantly work. For example, the auto-logout function may be activated based on a preset timer value t3 only in steps S3-012, S11-007, and S11-009, and may be stopped in step S5-007. This configuration can also provide the same advantageous effects as the effects of the first and second exemplary embodiments.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-094079 filed Apr. 15, 2010, which is hereby incorporated by reference herein in its entirety.

What is claimed is:

1. An image processing apparatus comprising:
a first authentication unit configured to authenticate a user;
a second authentication unit configured to authenticate the user;
an operation unit configured to receive an operation from the user;
a logout unit configured to set the user in a logout state in which the user is unauthenticated, if a predetermined time has passed without the operation unit receiving any operation from the user while the user is authenticated by the first authentication unit or the second authentication unit; and
a change unit configured to change the predetermined time to a second time shorter than a first time, if the user is unauthenticated by the second authentication unit while the user is authenticated by the first authentication unit and the second authentication unit.

2. The image processing apparatus according to claim 1, wherein, after the change unit changes the predetermined time to the second time, the change unit changes the predetermined time to the first time if the operation unit receives any operation from the user before the second time has passed.

3. The image processing apparatus according to claim 1, wherein, after the change unit changes the predetermined time to the second time, the logout unit causes the first authentication unit to unauthenticate the user if the second time has passed without the operation unit receiving any operation from the user.

4. The image processing apparatus according to claim 1, wherein the operation unit includes a display unit configured to display an operation screen, and a logout button configured to cause the authentication unit to unauthenticate the currently authenticated user,
wherein the operation unit displays, on the display unit, the operation screen for receiving an instruction to select the authentication unit by which the user is unauthenticated, if the logout button is pressed while the user is authenticated by the first authentication unit and the second authentication unit, and
wherein the authentication unit of the first authentication unit and the second authentication unit that is selected by the user's instruction issued to the operation screen unauthenticate the user.

5. The image processing apparatus according to claim 4, wherein the first authentication unit and the second authentication unit unauthenticate the user, if the operation unit receives an instruction to select the first authentication unit and the second authentication unit issued from the user to the operation screen which the operation unit displays to receive the instruction to select the authentication unit by which the user is unauthenticated.

6. The image processing apparatus according to claim 1, wherein authentication of the user by the first authentication allows the user to use the image processing apparatus, and authentication of the user by the second authentication allows the user to use a specific function provided to the image processing apparatus.

7. The image processing apparatus according to claim 6, wherein the second authentication unit authenticates the user after the user is authenticated by the first authentication unit to be allowed to use the image processing apparatus.

8. The image processing apparatus according to claim 7, wherein the logout unit does not cause the second authentication unit to unauthenticate the user while the user is authenticated by the first authentication unit and the second authentication unit, even if the predetermined time has passed without the operation unit receiving any operation from the user.

9. The image processing apparatus according to claim 6, wherein the specific function is a function of sending an image.

10. The image processing apparatus according to claim 6, wherein the specific function is a print function.

11. The image processing apparatus according to claim 1, wherein authentication information required when the first authentication unit authenticates the user is different from authentication information required when the second authentication unit authenticates the user.

12. A user authentication method for an image processing apparatus, the method comprising:
authenticating a user by a first authentication unit;
authenticating the user by a second authentication unit;
setting the user in a logout state in which the user is unauthenticated, if a predetermined time has passed without an operation unit, which is configured to receive an operation from the user, receiving any operation from the user while the user is authenticated by the first authentication unit or the second authentication unit; and
changing the predetermined time to a second time shorter than a first time, if the user is unauthenticated by one of the authentication units while the user is authenticated by the first authentication unit and the second authentication unit.

13. A non-transitory storage medium storing a program for causing an image processing apparatus to execute a user authentication method, the method comprising:
authenticating a user by a first authentication unit;
authenticating the user by a second authentication unit;
setting the user in a logout state in which the user is unauthenticated, if a predetermined time has passed without an operation unit, which is configured to receive an operation from the user, receiving any operation from the user while the user is authenticated by the first authentication unit or the second authentication unit; and
changing the predetermined time to a second time shorter than a first time, if the user is unauthenticated by one of the authentication units while the user is authenticated by the first authentication unit and the second authentication unit.

* * * * *